US007993202B2

(12) United States Patent
Rowe et al.

(10) Patent No.: US 7,993,202 B2
(45) Date of Patent: Aug. 9, 2011

(54) SERVER BASED METER MODEL SOFTCOUNT AND AUDIT PROCESSING FOR GAMING MACHINES

(75) Inventors: Richard E. Rowe, Incline Village, NV (US); Michael M. Oberberger, Reno, NV (US); Michael N. Low, Reno, NV (US)

(73) Assignee: IGT, Reno, NV (US)

( * ) Notice: Subject to any disclaimer, the term of this patent is extended or adjusted under 35 U.S.C. 154(b) by 517 days.

(21) Appl. No.: 11/038,705

(22) Filed: Jan. 18, 2005

(65) Prior Publication Data

US 2006/0160621 A1 Jul. 20, 2006

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/42; 463/25

(58) Field of Classification Search .................... 463/42
See application file for complete search history.

(56) References Cited

U.S. PATENT DOCUMENTS 4,031,991 A * 6/1977 Malott .......................... 194/217
5,655,961 A 8/1997 Acres et al.
6,099,408 A * 8/2000 Schneier et al. ................ 463/29
6,629,184 B1 9/2003 Berg et al.
6,682,423 B2 1/2004 Brosnan et al.
6,712,698 B2 3/2004 Paulsen et al.
6,800,029 B2 10/2004 Rowe et al.
6,804,763 B1 10/2004 Stockdale et al.
6,827,647 B1 * 12/2004 Loose et al. .................... 463/25
7,025,676 B2 * 4/2006 Cole et al. ....................... 463/25
7,112,138 B2 9/2006 Hedrick et al.
2001/0049303 A1 * 12/2001 Found et al. .................... 463/42
(Continued)

FOREIGN PATENT DOCUMENTS

GB 2284913 6/1995
(Continued)

OTHER PUBLICATIONS

International Search Report and Written Opinion from corresponding International application No. PCT/US2005/047406.

(Continued)

*Primary Examiner* — Dmitry Suhol
*Assistant Examiner* — Kevin Y Kim
(74) *Attorney, Agent, or Firm* — Weaver Austin Villeneuve & Sampson LLP

(57) ABSTRACT

Systems and methods for metering accounting activities on gaming machines are disclosed. Remote metering can be had for a gaming machine having a master gaming controller, an external cabinet housing a display device and one or more acceptors, dedicated meters, and communication paths between the master gaming controller and display device, and between meters and acceptors. Dedicated meters are located outside and remote from the external cabinet, and are adapted to track continuously at least one item of accounting information associated with the gaming machine. Such meters can be recognized by a gaming regulator as the official meters for the gaming machine, and can be located at a central location in close proximity to other dedicated meters associated with other gaming machines. Such meters can be individual discrete physical devices secured along dedicated communication lines, or can be electronic meters residing on a single server.

13 Claims, 7 Drawing Sheets

U.S. PATENT DOCUMENTS

| | | | | |
|---|---|---|---|---|
| 2002/0025850 | A1 | 2/2002 | Hafezi | |
| 2002/0115490 | A1 * | 8/2002 | Burnet et al. | 463/49 |
| 2002/0187834 | A1 * | 12/2002 | Rowe et al. | 463/42 |
| 2003/0014639 | A1 * | 1/2003 | Jackson et al. | 713/181 |
| 2003/0054880 | A1 | 3/2003 | Lam et al. | |
| 2003/0054881 | A1 | 3/2003 | Hedrick et al. | |
| 2003/0078103 | A1 | 4/2003 | LeMay et al. | |
| 2004/0180722 | A1 * | 9/2004 | Giobbi | 463/42 |
| 2005/0255911 | A1 * | 11/2005 | Nguyen et al. | 463/25 |
| 2006/0046855 | A1 * | 3/2006 | Nguyen et al. | 463/43 |

FOREIGN PATENT DOCUMENTS

| | | |
|---|---|---|
| WO | 2006/078433 | 7/2006 |

OTHER PUBLICATIONS

EPO Office Action mailed Jun. 23, 2008 in European Application No. 05855897.4.

Chinese Office Action mailed Nov. 7, 2008 in Application No. 200580046058.9.

Chinese Office Action mailed Mar. 1, 2010 in Application No. 200580046058.9.

EPO Summons to Attend Oral Proceedings mailed Apr. 12, 2010 in Application No. 05855897.4.

Australian Office Action mailed Sep. 10, 2010, in Application No. 2005325140.

EP Decision to Refuse a European Patent Application mailed Nov. 22, 2010, in Application No. 05855897.4.

* cited by examiner

SERVER BASED METER MODEL SOFTCOUNT AND AUDIT PROCESSING FOR GAMING MACHINES

TECHNICAL FIELD

The present invention relates generally to gaming machines such as slot machines, video poker machines and the like, and more specifically to systems and methods for metering monetary activities on such gaming machines.

BACKGROUND

Casinos and other forms of gaming comprise a growing multi-billion dollar industry that has experienced a marked shift over the past few decades from the use of fully mechanical gaming machines to electronic and microprocessor based gaming machines. In a typical gaming machine, such as a slot machine, video poker machine, video gaming terminal, or the like, a game play is first initiated through a player wager of money or credit, whereupon the gaming machine determines a game outcome, presents the game outcome to the player and then potentially grants an award of some type, including a monetary award, depending upon the game outcome. Although this process is generally true for both mechanical and electronic gaming machines, the electronic machines tend to be more popular with players and thus more lucrative for casinos for a number of reasons, such as increased game varieties, more attractive and dynamic video and audio presentations, and the ability to award larger jackpots. Other well-known attractive features of electronic gaming machines also exist from the perspective of casinos and other gaming operators. Most gaming machines currently in commercial use within casinos and other gaming environments are thus unsurprisingly of the electronic variety, with such electronic gaming machines comprising both traditional free standing machines and alternative gaming servers and terminals.

Electronic and microprocessor based gaming machines typically include a number of hardware and software components to provide a wide variety of game types and game playing capabilities, with such hardware and software components being generally well known in the art. A typical electronic gaming machine comprises a central processing unit (CPU) or master gaming controller (MGC), which is usually located in a main cabinet of the gaming machine, and which typically controls various combinations of hardware and software components, devices and peripherals that encourage game play, allow a player to play a game on the gaming machine and control payouts and other awards. Software components can include, for example, boot and initialization routines, various game play programs and subroutines, credit and payout routines, image and audio generation programs, various component modules and a random number generator, among others.

Exemplary hardware devices can include various inputs that accept money and/or credits into the gaming machine, such as bill validators, coin acceptors, card readers and ticket acceptors, as well as user inputs to determine a wager amount and initiate game play, such as keypads, buttons, levers, touch screens and the like. Other common hardware devices include payout components such as coin hoppers and ticket printers, as well as player tracking units. In addition, any given gaming machine will typically have any number of audio and video display components that can include, for example, various speakers, visual display panels, belly and top glasses, exterior cabinet artwork, lights, top box dioramas, and cathode ray tubes, liquid crystal displays (LCDs), flat panels and/or other similar video displays for displaying game play and other assorted information. Many of these peripheral components and devices are built into a main cabinet of the gaming machine itself or into items closely associated with the gaming machine, such as a top box, which usually sits atop the main cabinet.

One particular hardware device used in virtually all gaming machines is the internal meter, of which there are typically several in any given gaming machine. Such meters can be mechanical, electrical or electromechanical, and are used to track a variety of items associated with each gaming machine, many of which tend to be accounting type items. Many of these accounting type meters are typically adapted to count and record one or more accounting items in real-time, and many are highly regulated by various gaming jurisdictions and authorities. Such gaming jurisdictions and authorities typically prefer or demand that actual physical metering devices be present for auditing purposes at every gaming machine or terminal in service, and tend to restrict how electronic or processor based meters may be devised and implemented. Various communication protocols and other details for devising and implementing electronic meters and data files within a gaming device, as well as interfacing with or forwarding communications from such meters and files along a network can be found in, for example, commonly owned U.S. Pat. Nos. 5,655,961 to Acres, et al.; 6,682,423 to Brosnan; 6,712,698 to Paulsen, et al.; 6,800,029 to Rowe, et al. and 6,804,763 to Stockdale, et al.; as well as U.S. patent application Ser. Nos. 10/040,239 to LeMay, et al. and 10/246,373 to Hedrick, et al., with each of the foregoing seven references being incorporated herein in its entirety and for all purposes.

Specific examples of accounting meters can include, for instance, history meters, transaction meters, vended meters, bookkeeping meters, and credit meters, among others, one or more of which can be in the form of "hard" or permanent lifetime meters and/or "soft" or battery backed RAM type meters. One or more bookkeeping meters for a given gaming machine can include data on items, such as, for example, coins accepted, coin credits, bills accepted, bill credits, total in, total out, combined drop, and attendant payouts, among others. These meters can be permanently installed within a gaming machine, whereby such a "lifetime" meter cannot be removed from the machine and can only be read at the machine itself. In addition, one or more meters can also be installed such that they can be removed from the machine and replaced with a similar meter. In some instances, such a removable meter may duplicate the function or counting of a permanently installed lifetime meter.

Presently, many gaming systems within casinos and other gaming establishments require that various removable meters be collected from many or all gaming machines on the floor on a periodic basis. These removed meters are then stored in a central location for use by those involved in back office accounting, reconciliation and marketing functions. Such systems require that casino personnel make appointed rounds and physically remove and replace meters from many or all gaming machines in use. Such systems tend to be inconvenient in many regards, such as in the time lapse involved in generating official meter counts recordings, and the requirement of a significant use of manpower in order to collect, replace, store and retrieve information from these physically present meters. In addition, while many existing systems provide apparatuses and methods for transferring data from individual gaming machine meters to or along a communication interface or network, such data transfers are considered informal for purposes of true meter counts, since some form of check or reconciliation against official physical meters is usually eventually required.

Accordingly, there exists a desire for improved systems and methods for metering the monetary intake and output of gaming machines, and in particular for such systems and methods to involve more convenient systems and methods to track and record the official bookkeeping metering counts for active gaming machines on the floor of a casino or other gaming establishment.

SUMMARY

It is an advantage of the present invention to provide unique systems and methods for metering gaming machine accounting activities from a remote location. This is accomplished by removing at least one meter from within one or more gaming machines and placing these meters at a more centralized and convenient location. The resulting system then permits official meter readings to be made more frequently and with considerably less effort. Since meter changeovers never need to take place, fewer meters are thus required, resulting in reduced overall meter costs.

According to one embodiment, the provided system and method involve the use of at least one gaming machine having one or more remotely located dedicated meters. Such a gaming machine is generally adapted for accepting wagers, granting monetary awards and presenting one or more games for play by a player thereon, and also comprises a master gaming controller adapted to control functions associated with its operation, an external cabinet defining an interior region and adapted to house various gaming machine components, a display device within or about the external cabinet and adapted to display game play information to a player, a communication link or path between the master gaming controller and display device, one or more acceptors within or about the external cabinet adapted to accept at least one indicia of credit in association with the play of the gaming machine, and a communication link or path between each dedicated meter and its respective acceptor or acceptors. One or more of the remotely located dedicated meters are adapted to track continuously at least one item of accounting information associated with said gaming machine, and each such dedicated meter is located outside and remote from the external cabinet.

Exemplary indicia of credit can include coins, bill currency, coupons, tickets, and electronically transferred funds; exemplary acceptors can include coin acceptors, bill acceptors, coupon acceptors, ticket acceptors, electronic fund transfer interface devices, player tracking units, and radio frequency transceivers; and exemplary items of accounting information can include coins accepted, coin credits, bills accepted, bill credits, total in, total out, combined drop, and attendant paid, among others. Various detailed embodiments may include remotely located dedicated meters that are recognized by a gaming regulator or authoritative gaming body as the official meters for various items of accounting information for one or more gaming machines. In addition, such remotely located dedicated meters can be located in close proximity to other dedicated meters associated with other gaming machines, thus conveniently creating a single central location for many such meters.

According to one particular embodiment, the provided system and method involves the use of individual discrete physical devices for many or all of these remotely located meters. Such individual discrete physical devices can be secured along dedicated communication lines, and can be USB compatible electromechanical devices or meters. These physical metering devices can be located in close proximity to one another in banks, on shelves and/or in cabinets, and can be organized and labeled in such a fashion so as to streamline the meter reading process for many or all gaming machines within a certain region or establishment. In addition, further communication lines from these remotely located physically discrete individual meters can connect to a broader gaming or information network, such that information from a single meter, single gaming machine, group of meters or group of gaming machines can be made readily available from such a network.

According to another particular embodiment, the provided system and method involves the use of one or more remote servers, with a plurality of the remotely located dedicated meters being electronic meters residing on this server or servers. Such electronic meters can be individual and discrete non-volatile memory cards or other discrete memory chips or units, or a plurality of these meters can reside on a single memory card or unit. In the event that one or more official meters reside on such a central server, it is also possible for the master gaming controller and other gaming machine components to also resides on such a central server. Such an arrangement effectively reduces the gaming machine cabinet, displays and acceptors to a "dummy" gaming terminal, with much or all of the primary processing and metering functions being done at the central server.

In other detailed embodiments, one or more of the remotely located dedicated meters can contain a transaction log adapted to record a plurality of accounting transactions that take place at a respective gaming machine. In addition, various gaming machines may also be fitted with secondary dedicated meters that are adapted to track continuously the same items of accounting information also tracked by some or all of the remotely located dedicated meter. Such secondary dedicated meter can be used for auditing or double-checking purposes, and as such are preferably physically located within the external cabinets of their respective gaming machines.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and elements for the disclosed inventive server based metering systems and methods. These drawings in no way limit any changes in form and detail that may be made to the invention by one skilled in the art without departing from the spirit and scope of the invention.

DETAILED DESCRIPTION

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

In general, the present invention relates to systems and methods for metering monetary activities on gaming machines such as slot machines, video poker machines and the like. Such metering systems and methods are desirable for a wide variety of reasons, including the ability to provide accurate bookkeeping information for a casino or other gaming establishment, as well as to comply with various legal obligations and regulations regarding the gaming industry in general. While many or all gaming systems and machines currently in use require that personnel physically visit and read, remove, and/or exchange physical meters at many or all gaming machines in operation, the present invention advantageously relieves this inconvenient and time consuming burden, and also permits official metering data for many or all affected gaming machines to be readily available in seconds or minutes, as opposed to the days or weeks typically required under many manual meter auditing systems.

Figure 1:
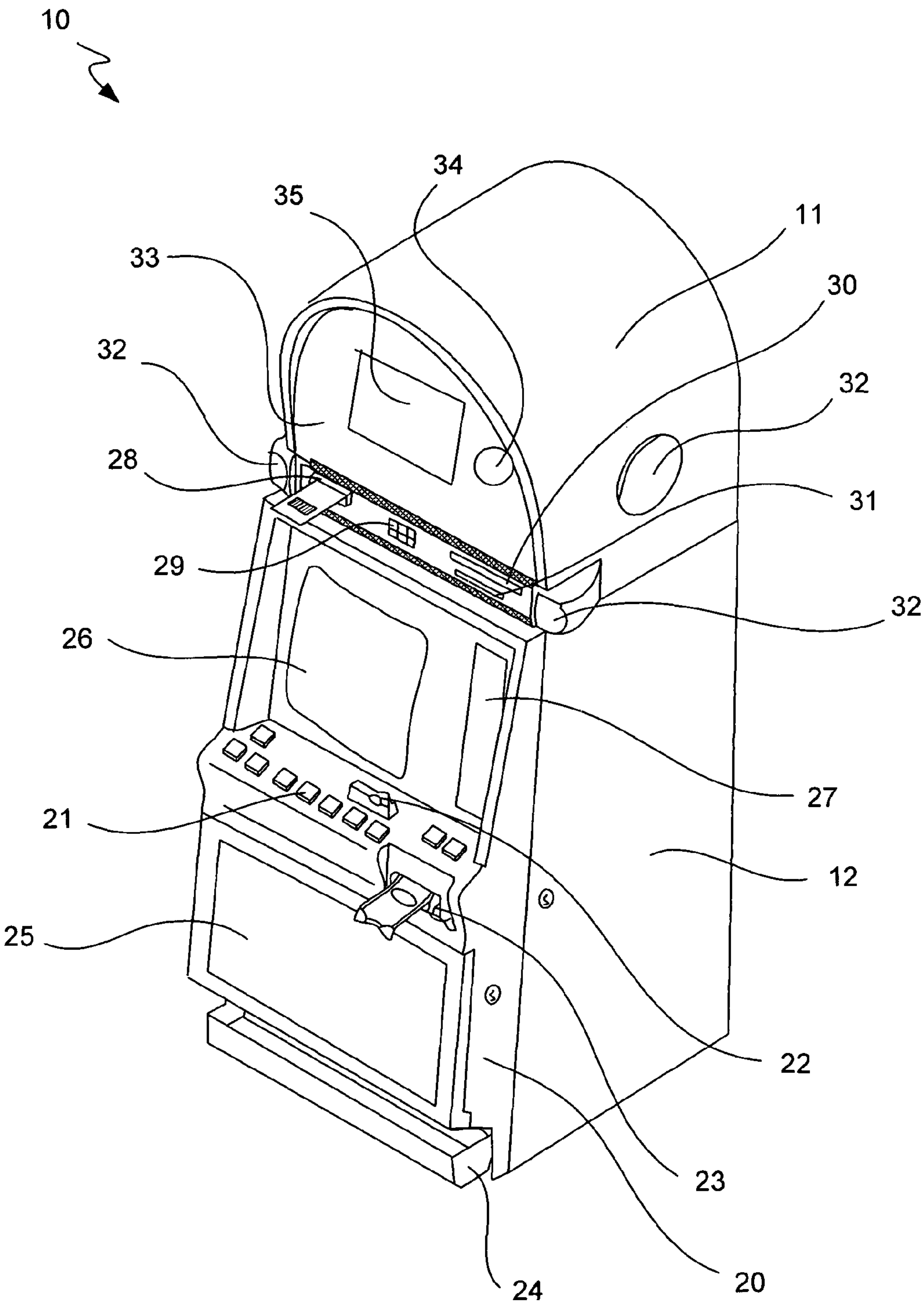
FIG. 1 illustrates in perspective view an exemplary gaming machine according to one embodiment of the present invention.

Turning now to FIG. 1, an exemplary gaming machine for use according to one embodiment of the present invention is illustrated in perspective view. Gaming machine 10 includes a top box 11 and a main cabinet 12, which generally surrounds the machine interior and is viewable by users. Main cabinet 12 includes a main door 20 on the front of the machine, which opens to provide access to the interior of the machine. Attached to the main door are typically one or more player-input switches or buttons 21, one or more money or credit acceptors, such as a coin acceptor 22, and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional electronically controlled video monitor. Top box 11, which typically rests atop of the main cabinet 12, may also contain a ticket printer 28, a key pad 29, one or more additional displays 30, a card reader 31, one or more speakers 32, a top glass 33, one or more cameras 34, and one or more secondary video display monitors 35, which may also be a cathode ray tube, high resolution flat-panel LCD, plasma/LED display or other conventional electronically controlled video monitors. Other components and combinations are also possible, as is the ability of the top box to contain one or more items traditionally reserved for main cabinet locations, and vice versa.

It will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. While gaming machine 10 is usually adapted for live game play with a physically present player, it is also contemplated that such a gaming machine may also be adapted for remote game play with a player at a remote gaming terminal. Such an adaptation preferably involves communication from the gaming machine to at least one outside location, such as a remote gaming terminal itself, as well as the incorporation of a gaming network that is capable of supporting a system of remote gaming with multiple gaming machines and/or multiple remote gaming terminals.

Gaming machine 10 may also be a "dummy" machine, kiosk or gaming terminal, in that all processing may be done at a remote server, with only the external housing, displays, and pertinent inputs and outputs being available to a player. Further, it is also worth noting that the term "gaming machine" may also refer to a wide variety of gaming devices in addition to traditional free standing gaming machines such as that shown in FIG. 1. Such other gaming machines can include kiosks, set-top boxes for use with televisions in hotel rooms and elsewhere, and many server based systems that permit players to log in and play remotely, such as at a personal computer or PDA. All such gaming devices can be considered "gaming machines" for purposes of the present invention and following discussion, with all of the disclosed metering techniques and devices being adaptable for such uses of alternative gaming machines and devices.

Figure 2:
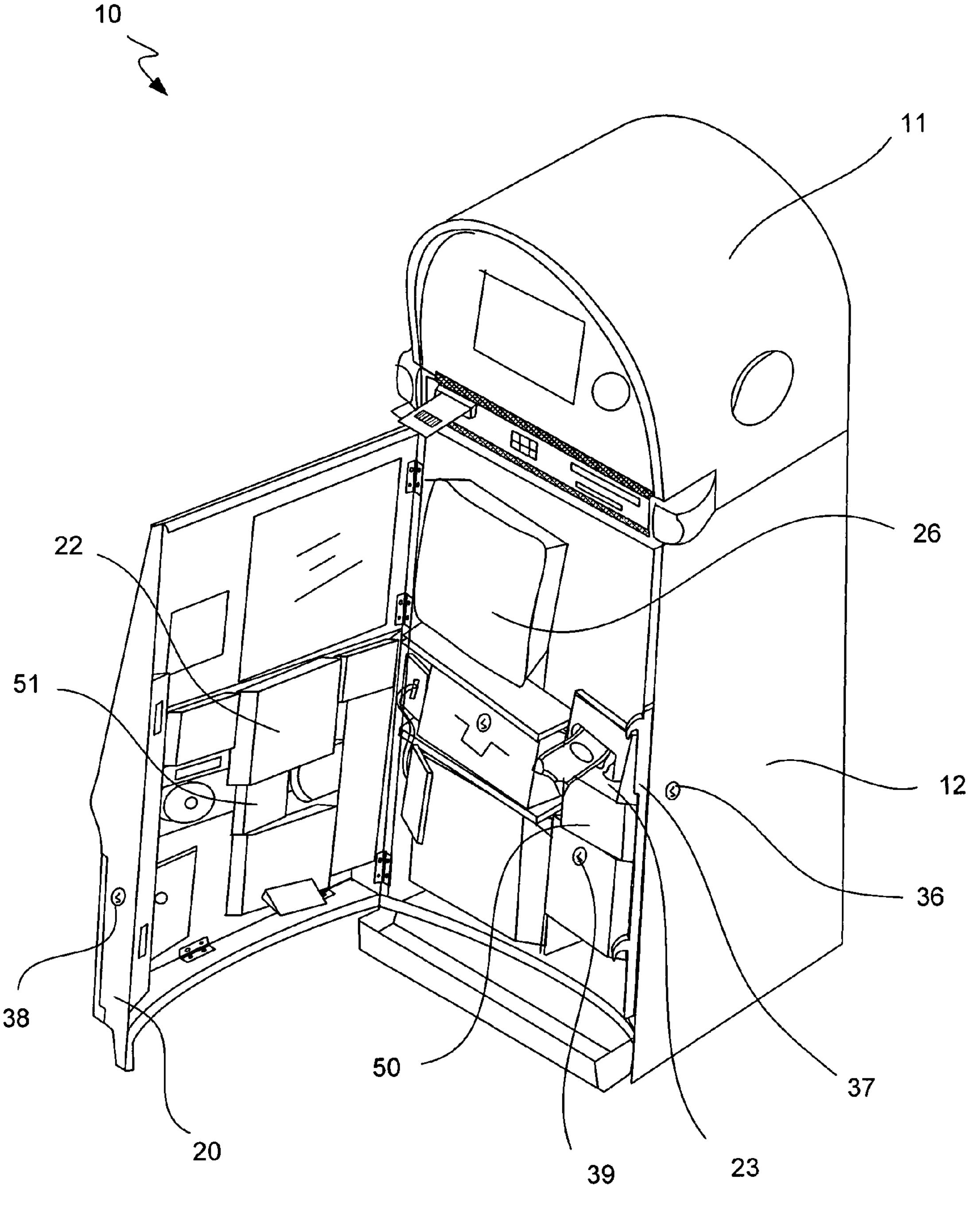
FIG. 2 illustrates in perspective view the gaming machine of FIG. 1 having an opened main door according to one embodiment of the present invention.

With reference to FIG. 2, the gaming machine of FIG. 1 having an opened main door is illustrated in perspective view. In additional to the various exterior items described above, such as top box 11, main cabinet 12 and primary video display monitor 26, gaming machine 10 also comprises a variety of internal components. As will be readily understood by those skilled in the art, gaming machine 10 contains a variety of locks and mechanisms, such as main door lock 36 and latch 37. Other locks 38, 39 on various other machine components can also be seen. Internal portions of coin acceptor 22 and bill or ticket validator 23 can also be seen, along with the physical meters associated with these peripheral devices. Bills accepted meter 50 is associated with the bill or ticket validator and is adapted to count and record all bills accepted by the gaming machine, while coins accepted meter 51 is associated with the coin acceptor and is adapted to count and record all coins accepted by the gaming machine. Each of these meters is preferably positioned such that a number or counter contained thereon may be readily seen and read, and also such that the entire meter or meter assembly may be readily removed from the gaming machine entirely. Other meters not shown may also be physically present, as will be readily understood by one skilled in the art. Of course, many other permutations, variations and locations for the various meters within a gaming machine may be used, and not every type of meter may be present in a given form or at all within a given gaming machine.

Figure 3A:
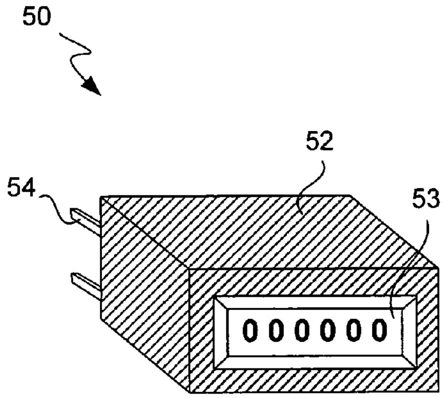
FIGS. 3A through 3D illustrate in perspective view several exemplary single electromechanical meters and arrangements of multiple electromechanical meters according to various embodiments of the present invention.
Figure 3B:
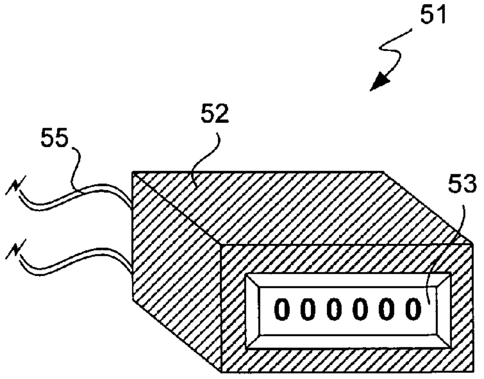

Referring now to FIGS. 3A through 3D, several single electromechanical meters and arrangements of multiple electromechanical meters are illustrated in perspective view. As shown in FIG. 3A, meter 50 can be a printed circuit board (PCB) mounted electromechanical meter. Such a meter typically has a housing 52, a counter or numerical display 53 and one or more pin contacts 54 adapted for mounting the meter to a PCB. In one particular embodiment, meter 50 can be IGT (Reno, Nev.) Part Reference Number 29209390. As shown in FIG. 3B, meter 51 can be a hard wired or "flying leads" type electromechanical meter. Such a meter also typically has a housing 52 and counter 53, but for contacts has one or more wire leads 55. In a particular embodiment, meter 51 can be IGT Part Reference Number 29203490. In either meter, counter 53 is preferably non-resettable, and preferably contains six or more digits, although the use of any and all meters is specifically contemplated. A wide variety of communication types, protocols, and power adaptations can be used for either meter, and any and all such variations are also contemplated for use with the present invention. Further, while PCB meter 50 and flying lead meter 51 have been identified as corresponding to a bill acceptor and coin acceptor respectively within gaming machine 10, it will be readily understood that these and other similar such meters can be designed for and used with various gaming machine peripherals interchangeably, and that the present specific illustrative example does not limit the disclosed invention in any way. In fact, it may be preferable to include only one type of meter within or for a given gaming machine.

Figure 3C:
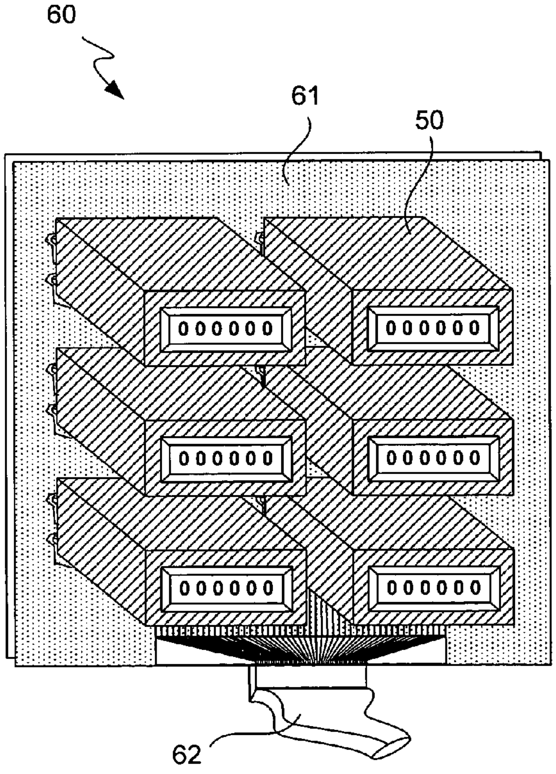
Figure 3D:
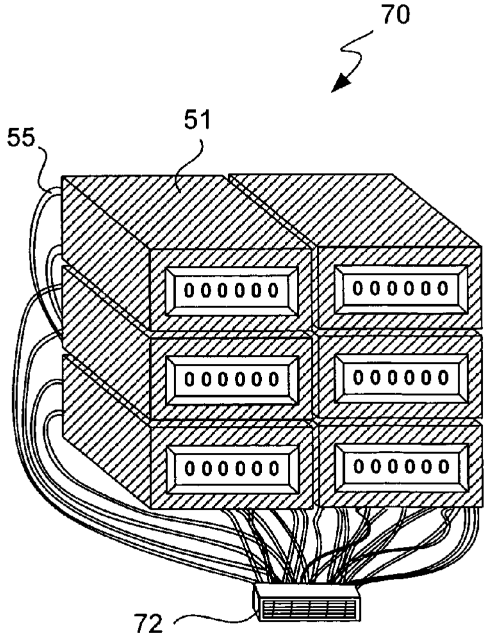

Moving on to FIG. 3C, an exemplary meter arrangement 60 is shown. Each of a plurality of PCB meters 50 is attached in ordered fashion to a common PCB 61. A standardized communication jack 62 attached to PCB 61, permits the ready removal or replacement of the full board of meters, and may also allow for convenient harnessing and organization of meters for various communication purposes. In one embodiment, meter arrangement 60 is designed such that some, all similar, or simply all meters for a given gaming machine can be placed in one centrally convenient location. Although meter arrangement 60 may be housed within the gaming machine itself, it may rather be located elsewhere remote from the gaming machine, as described in greater detail below. In FIG. 3D, an alternative exemplary meter arrangement 70 is shown, wherein each of a plurality of flying lead meters 51 is connected to a common communication harness or jack 72. This collection of meters can be bundled in an organized fashion for convenient reading purposes, can similarly be adapted for easy removal, and can also similarly be adapted for location within or remote from a given gaming machine.

While both of FIGS. 3C and 3D illustrate a set of six meters for each individual gaming machine, it will be readily appreciated that more or less meters may be used for a given machine, and that some or all meters for a given gaming machine or series of gaming machines may be organized in such a fashion. For example, some arrangements may have up to a dozen or more individual meters for each gaming machine, while others may have only one meter per machine.

In some instances, a plurality of functions for a gaming machine may be tracked on individual physical meters within a single common housing, with a separate display or counter visible on the housing for each tracked function. In such instances, one or two meters with up to a dozen or more separate counters may be used.

Figure 4:
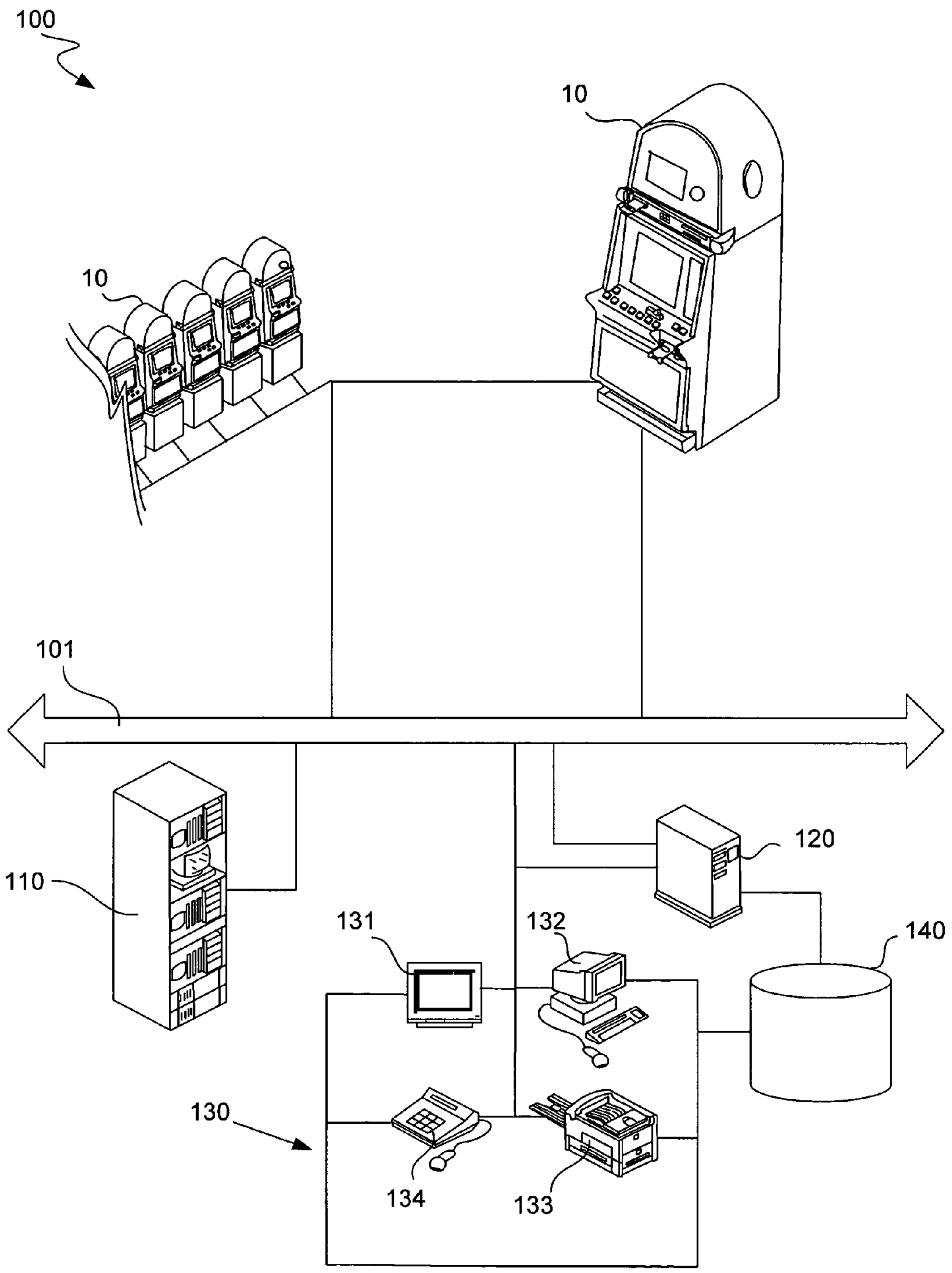
FIG. 4 illustrates a block diagram of an exemplary metering system or network including one or more gaming machines according to one embodiment of the present invention.

Turning now to FIG. 4, a block diagram of an exemplary metering system or network including one or more gaming machines according to one embodiment of the present invention is illustrated. In this embodiment, a provided system 100, and preferably a network or like structure, contains a plurality of gaming machines 10 in communication with at least one central server, with at least one of the included gaming machines being adapted to have its metering functions performed and recorded remotely at the central server. System 100 contains a plurality of gaming machines 10 in one or more locations, with the mechanical, electromechanical and/or electronic meter or meters of one or more of the system gaming machines being connected to various network devices through one or more wired or wireless communication links. Any suitable communication means can be use to connect the gaming machines to the network and one or more servers or hosts. For example, a common network bus 101 can connect some or all of these gaming machines with other network components, such as, for example, a central host or server such as general-purpose server 110. Alternatively, a token ring, direct proprietary communication lines or any of a variety of more secure communication means can be used. In addition, any of a variety of secure data encryption methods or systems may be used to preserve the integrity of the transmitted metering data.

General-purpose server 110 may be one that is already present within an establishment for one or more other purposes in lieu of or in addition to the collection and recordation of gaming machine metering data. Other functions for such a networked general-purpose server can include, for example, accounting and payroll functions, Internet and e-mail capabilities, switchboard communications, reservations and other hotel and restaurant operations, and other assorted general establishment operations. In some instances, metering functions may also be associated with or performed by such a general-purpose server. For example, such a server may be linked to one or more gaming machines within an establishment, and in some cases form a network that includes all or substantially all of the gaming machines within that establishment. Communications can then be exchanged from each machine to metering records and programs on the general-purpose server.

In a preferred embodiment, however, system 100 also has at least one special purpose gaming machine metering host or server 120 used for various functions relating to metering events on appropriate gaming machines in the system. Such additional metering hosts or servers are desirable for a variety of reasons, such as to lessen the burden on the general-purpose server or to isolate or wall off some or all metering information from the general-purpose server and thereby limit the possible modes of access to such information. Alternatively, system 100 can be isolated from any other network within the establishment, such that a general purpose server 110 is entirely impractical, and such that one or more special purpose hosts or servers 120 dedicated solely to metering matters are implemented.

In one embodiment, the central server includes at least one data storage element for storing the metered information. The data storage element may comprise a hard drive, RAM, tape drive, CD-ROM, DVD-RAM or other memory or data storage member or element. Server 120 may also be associated with a number of other devices, such as one or more displays, keyboards and other devices for displaying data, controlling operation thereof and the like. For example, this server may also include connections to a sub-network 130 of one or more network accessing devices, as well as a database or other suitable storage medium 140, as shown. Network devices may include, but are not limited to, one or more video monitors 131, one or more user terminals 132, one or more printers 133, and one or more other digital input devices 134, such as a card reader or other security identifier, as desired.

In one particular embodiment, the actual electronic or electromechanical meters on server 120 can be individual and discrete non-volatile memory cards or other discrete memory chips or units. For purposes of security and authenticity, one discrete unit for each individual meter or gaming machine can be used, with each discrete unit preferably being separable and available for an isolated analysis and possible removal in the event of a specific audit. Alternatively, a plurality of meters can reside on a single memory card or unit. In one embodiment, one large memory unit, a collection of smaller units, or a collection of individual memory cards can be associated into a single database, such as database 140, with information from this collection of memory units being readily available for many users and for a variety of purposes.

As will be readily appreciated, it is particularly preferable that each of the remotely located meters, whether all on a server, series of servers or otherwise, be the official meter for the function or functions tracked for its respective gaming machine. In this regard, it is important that each meter be dynamically updated in real time as events occur on the gaming machine itself. Such events can be, for example, coins or bills in, credits played, game results, coins paid out by the gaming machine, other payouts, and other assorted machine events, among others. It is also worth noting that while the terms communication link and path are used in fairly interchangeable fashion herein, that at least the term communication path can refer to any direct or indirect means of communicating from one device or location to another, such as through several intermediary devices, lines or links.

In addition, in the event that one or more meters reside on a central server such as general purpose server 110 or metering server 120, it is also possible for the master gaming controller and other gaming machine components from one or more gaming machines to also reside on such a central server. Such an arrangement effectively reduces the gaming machine cabinet, displays and acceptors of an affected gaming machine 10 to a "dummy" gaming terminal, with much or all of the primary processing and metering functions being done at the central server. Such an arrangement may be advantageous in that more secure and direct communication lines from the MGC to the respective machine meters can be had.

Figure 5:
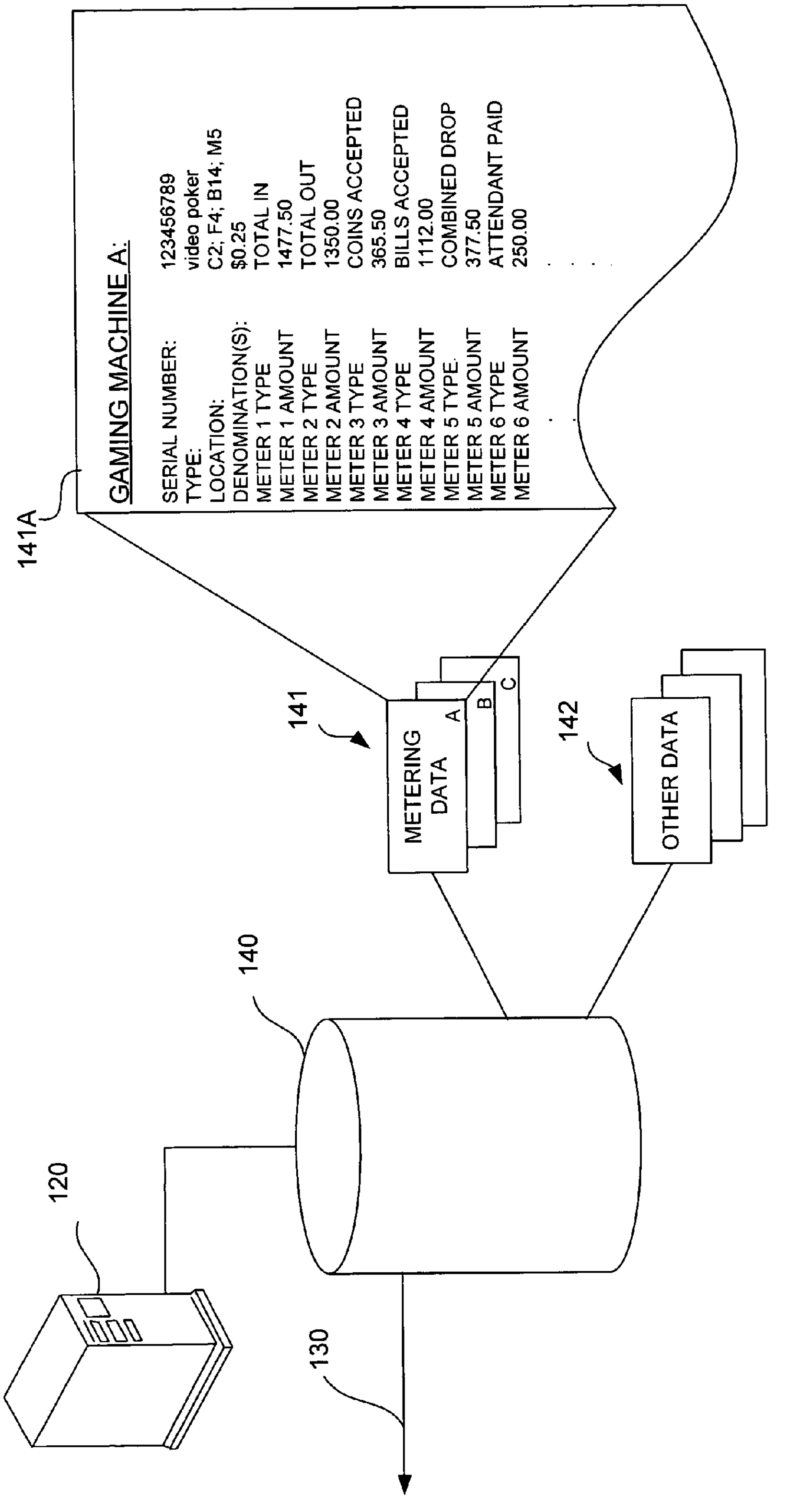
FIG. 5 illustrates a block diagram of an exemplary database containing associated data identifiers of various gaming machines according to one embodiment of the present invention.

Referring to FIG. 5, a block diagram of an exemplary database containing associated data identifiers of various metered gaming machines according to one embodiment of the present invention is illustrated. As similarly illustrated in FIG. 4, database 140 is accessible to one or more servers, preferably at least gaming machine metering central server 120, and has a connection to a network 130 of one or more peripheral devices. Database 140 preferably contains information or data files related to metering information on a plurality of gaming machines, as well as other items of information related to such metered gaming machines within the system. In addition, database 140 can be constructed such that it also contains information or data files with respect to other gaming machines or other pertinent items of tracked data, as desired. Contained within database 140 are numerous files with respect to various gaming machines within the centralized metering system, and preferably all such gaming machines are contained within database 140 or a collection of associated databases. Although many different arrangements are possible, such files can be classified according to metering data files 141 and other data files 142, which other files are not of primary concern for purposes of the present invention.

Contained within each metering data file is a profile for a tracked gaming machine profile having numerous informational items. As shown for gaming machine file 141A, such information can include items such as, for example, a gaming machine identifier such as a serial number, a type, such as reel slots, video slots, video poker or specific game types, denominations of games played by that machine, restriction and security information with respect to that machine, and various meter types and current readings, among others. Various meter types can include, for example, coins accepted, coin credits, bills accepted, bill credits, total in, total out, combined drop, and attendant paid, among others. Such informational items can not only be stored within one or more reserved gaming machine files within the database, but can also be readily retrieved, utilized and/or forwarded by the centralized server for review or use by any user or other processor within the system or network.

It will be appreciated that the central metering server 120 may be located remotely from some or all system gaming machines 10. Further, one or more gaming machines 10 that are located remotely from one another may be associated with the same central metering server 120. One or more system gaming machines may thus be associated with one location, different gaming properties or operators, or a variety of properties or locations operated by a single or multiple parties. Under such an embodiment, the one or more communication links forming the network 100 may comprise phone lines or the link connecting the properties. For example, the network 100 may form a WAN or other similar networked body. One or more aspects of the invention may be implemented as hardware or software. For example, the central metering server may be configured to execute computer readable program code for implementing one or more steps of the method of the invention. Such steps may comprise receiving metering data directly from the gaming machine, and even directly from the individual peripheral units on the gaming machine that detect activity, such as coin and bill acceptors.

In one or more embodiments, the metering system may be associated with other systems or networks providing communication to the gaming machine. For example, an existing gaming machine may be fitted for credit card use. A credit card reader, controller and communication interface may be associated with the gaming machine, and a communication path established from the interface to a remote location, such as via an installed cable. In accordance with the present invention, the metering system may be implemented on this credit card network. Preferably, additional peripheral devices are associated with the credit card controller, such as lights, a display and the like. In another arrangement, a separate metering system controller maybe provided in communication with the metering server via the communication path/link of the credit card system.

Alternatively, dedicated and secured communication lines to and from each individual gaming machine or individual gaming machine peripheral detecting relevant information (e.g., coin or bill acceptors) may be desired for purposes of security and authenticity in maintaining the integrity of all metering records and communications. Such dedicated and secured lines may be inconvenient with respect to installation, but may be necessary in many jurisdictions due to the highly regulated nature of the industry and likely concerns from regulators, gaming operators and other concerned parties with respect to the desire for secure, reliable and verifiable nature of any and all gaming machine metering data. Various additional procedures and devices for heightening the levels of security, reliability and verifiable nature of such server based and otherwise remotely located meters can thus be implemented.

For example, in addition to dedicated transmission lines and provisions for each gaming machine or each and every meter having own dedicated memory card, chip or device, it may be desirable to keep separate physically present auditing meters within each gaming machine itself. Such meters may be similar to those currently kept within the actual gaming machine housing, and as such may be perceived as being less susceptible to tampering or fraud. While the official gaming machine meters are thus maintained and updated in real time on the central server, these separate physically present auditing meters can also be adapted to do likewise. Periodic reviews or checks of these physically present auditing meters can then be made, with such audits or checks happening at a substantially reduced frequency than what currently occurs in most gaming systems. Furthermore, such physically present meters may also be available at any time in the event that a casino or other gaming operator is audited by state regulators or any other gaming authority or overseeing body. In this manner, it may become appropriate for such a state regulator or any other gaming authority or overseeing body to formally authorize or recognize the use of the remotely located meters as the "official" meters for the respective gaming machine or machines.

Figure 6:
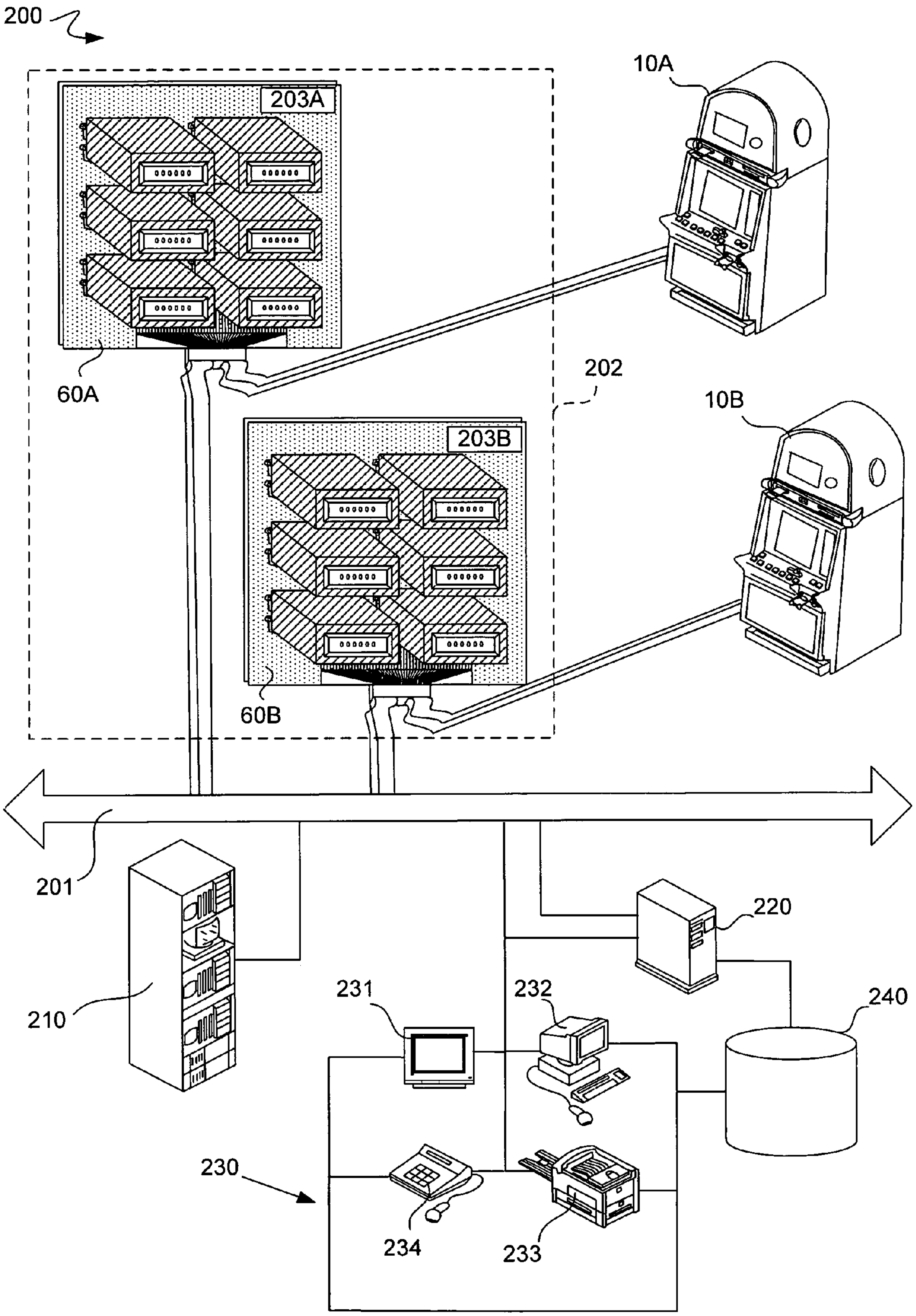
FIG. 6 illustrates a block diagram of an alternative exemplary metering system including one or more gaming machines according to another embodiment of the present invention.

In the event that the adoption of fully electronic meters within a central server as the legally recognized meters for one or more gaming machines proves difficult or impractical, other systems and methods may also be used for conveniently locating many or all gaming machine meters remotely at a central location. Turning now to FIG. 6, a block diagram of an alternative exemplary metering system including one or more gaming machines is illustrated according to another embodiment of the present invention. Gaming system 200 is preferably a network or like structure having a plurality of gaming machines 10A, 10B in communication with at least one or more remote meters. As in the foregoing embodiment, gaming system 200 has a plurality of gaming machines in one or more locations, with the mechanical, electromechanical and/or electronic meter or meters of one or more of the system gaming machines being connected to various network devices through one or more communication links, such as via a common network bus 201. It will be readily understood that any protocol or communication type can be used, however. As in the foregoing system embodiment, gaming system 200 may similarly comprise a general-purpose server 210, a special purpose metering host or server 220, a sub-network 230 of one or more network devices, and a database or other suitable storage medium 240, as shown. As before, network devices may include, but are not limited to, one or more video monitors 231, one or more user terminals 232, one or more printers 233, and one or more other digital input devices 234, such as a card reader or other security identifier, as desired.

Unlike the foregoing embodiment, however, the formal metering units for one or more gaming machines do not reside on a server, but are rather individual meter units located remotely from their respective gaming machines. As shown, gaming machine 10A has a separate dedicated communication link or path to a set of remotely located dedicated meters 60A, while gaming machine 10B has its own dedicated communication link or path to a set of remotely located dedicated meters 60B. Each meter or set of meters is also preferably in communication with a system or network, such as via common bus 201. In one embodiment, the communication lines to these remote meters do not permit input from the network, such as from common bus 201, such that the only normal input to each meter is from its respective gaming machine. In another embodiment, any input from the network is limited to queries, such that adjusting or tampering of the actual count on a meter from the network is not allowed.

Both sets of remote meters, 60A for gaming machine 10A and 60B for gaming machine 10B, are preferably located in proximity to one another, such as at a separate remote location or area 202. Such a remote location can be, for example, a back room, control region, server or computing room, meter rack, shelf or closet, or any of a number of other possibilities. Further, while only two gaming machines and their respective meters are illustrated here for purposes of simplicity, it will be readily understood that dozens, hundreds, or even thousands of gaming machines can similarly have one, some or all of their respective meters located at the same central remote location. In such instances, it may be preferable to organize banks, racks or shelves of meters for easier reading and review. Such organization may involve, for example, identifying labels 203A, 203B, which allow for ready correlation with known gaming machine serial numbers or other identifiers.

As in the foregoing embodiment, it is particularly preferable that each of the remotely located meters be the official meter for the function or functions tracked for its respective gaming machine. In this regard, it is important that each meter be dynamically updated in real time as events occur on the gaming machine itself. Again, such events can be coins or bills in, credits played, game results, coins paid out by the gaming machine, other payouts, and other assorted machine events. Because each meter is an individual physical unit in gaming system 200, it may be easier to establish such remotely located meters as the official meters for their respective machines. Such an arrangement can differ from current arrangements largely in that the connection or communication link or path between the meter and respective processor or input or output peripheral is extremely long, such that the meter can be located outside and remotely from the gaming machine itself.

As also noted above, to facilitate a heightened level of security and reliability with such remotely located meters, dedicated hard wired communication lines can run directly from each pertinent gaming machine peripheral to its respective meter, communications can be encrypted or protected in other similar fashion, and secure devices, protocols and connectors can be used. For example, each physically independent meter can be a USB compatible device that is connected via a safejack or other similarly secure connection to a dedicated and direct communication line, with communications being sent under an encrypted public key protocol or other similarly protected means. Of course, other devices and methods for securing communications to remotely located meters and otherwise raising the confidence level in such meters and their readings or counts may also be used.

In the event that many individual USB type meters are used, one or more USB device class managers may also be implemented on the network or system. As will be readily appreciated, such a USB device class manager can be adapted to locate and load any shared object drivers that communicate either with a driver process or directly with a USB peripheral. In one embodiment, only approved shared objects are packaged with the system. Also, the shared objects may be approved by one or more entities, such as a regulators from one or more gaming jurisdictions, a gaming machine manufacturer, a third party vendor or a third party standards group. In addition, if the USB device class manager detects a USB device or other peripheral that is not on a specific "approved" list, the device can put one or more system machines into a non-playable state and notify a system administrator or security. Given the nature of USB devices and systems, such a measure can prevent system fraud such as an inappropriate device or software for an illegal device from being planted on the system or network. In the standard USB architecture, any USB-compatible device may connect to a USB-compatible network. For security reasons, this level of connectivity may not be desirable in the gaming industry, such that the use of a USB device class manager may be desirable in the present invention.

As noted above, another security measure may be the use of cryptography in the messages or data transferred to each remotely located USB metering device. The USB device class manager may assign cryptographic keys to each meter, and exchange public encryption keys with each meter in a public-private encryption key scheme. In another embodiment, random symmetric encryption keys may be generated and assigned to each meter. During run-time, the encryption keys for each meter may be regularly changed by the USB device class driver at regular or random time intervals, as desired. The USB device class manager may also provide CRC verification or other hashing function verification of peripheral firmware, if needed. For instance, the USB device class manager may request a USB meter or other linked device to generate a CRC of all of its firmware or a random section of its firmware. This CRC may be compared with a CRC of approved firmware stored on the meter or other device. This method may be used to ensure that the meter or other network device is running proper firmware at all times. Hashing function algorithms may also be used to sign messages sent between devices. The contents of the message may be verified using hashing function algorithms. One exemplary embodiment of a USB-compatible device identification protocol is described in co-pending U.S. application Ser. No. 10/246,367, entitled "USB Device Protocol for a Gaming Machine," by Lam, et al., which reference is incorporated herein in its entirety and for all purposes.

Similar to the foregoing server based meter embodiment, various gaming machines may also be fitted with secondary dedicated meters that are adapted to track continuously the same items of accounting information also tracked by some or all of the remotely located dedicated meter. Such secondary dedicated meter can be used for auditing or double-checking purposes, and as such are preferably physically located within the cabinets of their respective gaming machines. Separate or common lines of communication may run from the respective gaming machine processors and peripheral units to both the remotely located official meter and the corresponding secondary audit meter within the gaming machine.

In one embodiment, one or more of the remotely located dedicated meters can also contain or entirely comprise a transaction log adapted to record a plurality of accounting transactions that take place at a respective gaming machine. For gaming machines, an important function is the ability to store and re-display historical game play information in the event of audits, disputes and the like. The game history provided by a transaction or history log can thus assist in settling disputes concerning the results of game play. A dispute may occur, for instance, when a player believes an award for a game outcome has not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage on the gaming machine and displayed in some manner to a display on the gaming machine. In some embodiments, game history information may also be stored in a history database partition on an internal hard drive. Of course, such a hard drive is only one example of a mass storage device that may be used with the present invention, and any and all other devices and implementations common to transaction logs and gaming machine data histories may be used in conjunction with the present invention.

Typically, a master gaming controller may select and capture certain frames during credits in, credits out, and/or the game presentation to provide a game history. These decisions are typically made in accordance with particular game code executed by the controller. The captured frames may be incorporated into game history frames. Typically, one or more frames critical to the game presentation are captured. For instance, in a video slot game presentation, a game presentation frame displaying the final position of the reels is captured, while in a video blackjack game, a frame corresponding to the initial cards of the player and dealer, frames corresponding to intermediate hands of the player and dealer and a frame corresponding to the final hands of the player and the dealer may be selected and captured as specified. As in the case of some or all of the official meters for a given gaming machine, a transaction log or frame saving process can also be remotely located and stored, such as on a remote server, database, mass storage device or other like item at a central location. From this central location, stored data may preferably be readily retrievable by an attendant at the gaming machine itself, or by some other user connected to the network or system at some other location. Standard playback interfaces and features at the gaming machine, terminal, or other viewing or auditing location may be used, and it is specifically contemplated that any such convenient feature or component of a transaction log system may be implemented for use in the systems and methods disclosed herein.

Figure 7:
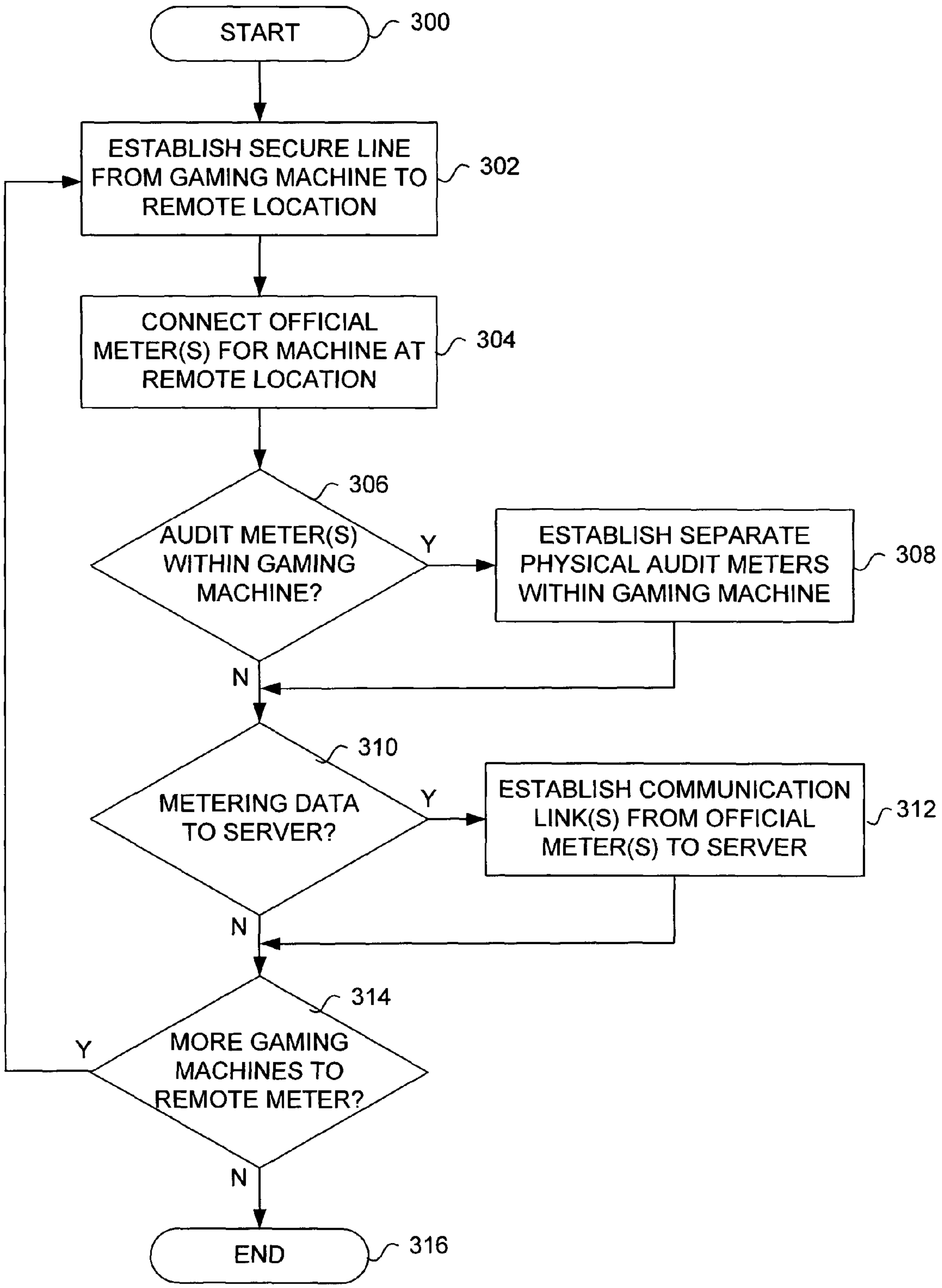
FIG. 7 illustrates a flowchart of one method of providing a remotely based metering system for a plurality of gaming machines according to one embodiment of the present invention.

FIG. 7 illustrates a flowchart of one method of providing a remotely based metering system for a plurality of gaming machines according to one embodiment of the present invention. Such a method is merely exemplary, and it should be noted that a remotely based metering system can be implemented in a wide variety of ways. According to the provided exemplary method, after an initial start step 300, a first process step 302 comprises establishing a secure communication line from a system gaming machine to a remote location. As discussed previously, such a communication line can be one or more dedicated lines, and for a higher level of security and reliability can be one or more dedicated lines per meter. At the next process step 304, one or more official meters for the gaming machine are connected at the remote end of the secure communication line or lines. As noted above, these meters can be server based, or can be individual devices, such as safejack secured USB compatible meters.

A following decision step 306 inquires as to whether a separate audit meter or meters are desired within the gaming machine itself. If desired, then such separate physically present audit meters are established within the gaming machine. Such audit meters can be used to audit or verify that the remote meters are working properly and have accurate readings. At the following decision step 310, an inquiry is made as to whether metering data should also be forwarded to a separate server. In the event that the remotely established meters are all individual devices, this may be highly desirable, such that metering information is readily available from a central server. If desired, then separate communication links or paths are established from the official meters to the server at a process step 312. At subsequent decision step 314, an inquiry is then made as to whether additional gaming machines are to be remotely metered. If so, then the process reverts to step 302 and starts over. If not, however, then the process terminates at a final end step 316.

As will be readily appreciated, many advantages can be realized through the implementation of one or more of the following embodiments. One such advantage that can be gained from locating many or all official gaming machine meters remotely is a reduced need for periodic rounds and collections of physical meters from each gaming machine. Reading the meters for many or all machines at one central remote location can be much easier, less time consuming, and involve fewer meters and other components in the long run. In addition, where a server is used either as an official metering unit or in conjunction with other physically independent official metering units, metering information can be readily available on demand, thus providing improved support for all accounting, marketing and other backend office functions requiring game play metering information. Many other advantages both in time, cost, and convenience may also be realized through the remote relocation of one or more gaming machine meters as disclosed herein.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A gaming system comprising:

a first gaming machine configured to accept wagers, present games for game players and grant monetary awards based on the outcomes of such games, said first gaming machine comprising a first external cabinet housing at least one first acceptor adapted to accept at least one first indicia of credit in association with the play of said first gaming machine and at least one first display device adapted to display game play information to a player of said first gaming machine;

a first meter configured as a dedicated, remotely located, electromechanical meter that tracks continuously at least one first item of accounting information associated with said first gaming machine, said first meter being located remotely from said first external cabinet and comprising an individual discrete physical device, and wherein said first meter is the official meter for said at least one item of accounting information for said first gaming machine;

a first communication link or path between said first meter and said at least one first acceptor;

a first cryptographic key assigned to the first meter and used to encrypt communications over the first communication link or path;

a second gaming machine configured to accept wagers, present games for game players and grant monetary awards based on the outcomes of such games, said first gaming machine comprising a second external cabinet housing at least one second acceptor adapted to accept at least one second indicia of credit in association with the play of said second gaming machine and at least one second display device adapted to display game play information to a player of said second gaming machine;

a second meter configured as a dedicated, remotely located electromechanical meter that tracks continuously at least one second item of accounting information associated with said second gaming machine, said second meter being located remotely from said second external cabinet and in close proximity to said first meter, and wherein said second meter is the official meter for said at least one item of accounting information for said second gaming machine;

a second communication link or path between said second meter and said at least one second acceptor; and a second cryptographic key assigned to the second dedicated electromechanical meter and used to encrypt communications over the second communication link or path, wherein a first communication link manager is configured to perform a hashing function verification of firmware associated with the first meter.

2. The gaming system of claim 1, wherein said at least one first indicia of credit is selected from the group consisting of coins, bill currency, coupons, tickets, and electronically transferred funds.

3. The gaming system of claim 1, wherein said at least one first acceptor is selected from the group consisting of coin acceptors, bill acceptors, coupon acceptors, ticket acceptors, electronic fund transfer interface devices, player tracking units, and radio frequency transceivers.

4. The gaming system of claim 1, wherein said at least one first item of accounting information is selected from the group consisting of coins accepted, coin credits, bills accepted, bill credits, total in, total out, combined drop, and attendant paid.

5. The gaming system of claim 1, wherein said individual discrete physical device comprises a USB compatible electromechanical meter.

6. The gaming system of claim 1, further comprising:

a third dedicated meter adapted to track continuously at least one exact item of accounting information also tracked by said first remotely located dedicated meter, said third dedicated meter being located within said first external cabinet of said first gaming machine;

a third communication link or path between said third dedicated meter and said at least one first acceptor; and a third cryptographic key assigned to the third dedicated meter and used to encrypt communications over the third communication link or path.

7. The gaming system of claim 1, further comprising a first communication link manager for the first communication link or path, the first communication link manager configured to change the first cryptographic key.

8. The gaming system of claim 7, wherein the first communication link manager is configured to change the first cryptographic key at regular intervals.

9. The gaming system of claim 7, wherein the first communication link manager is configured to change the first cryptographic key at random intervals.

10. The gaming system of claim 7, wherein the first communication link manager is further configured to randomly select a section of the firmware and to perform a hashing function verification of the randomly selected section of the firmware associated with the first meter.

11. The gaming system of claim 1, wherein the first communication link manager is configured to perform a CRC hashing function verification of firmware associated with the first meter.

12. A gaming system, comprising:

a plurality of gaming machines adapted for accepting wagers, granting monetary awards and presenting games for play by players thereon, each of said gaming machines having an external cabinet defining an interior region and adapted to house a plurality of gaming machine components, at least one display device within or about said external cabinet and adapted to display game play information, at least one acceptor within or about said external cabinet and adapted to accept at least one indicia of credit in association with the play of the gaming machine;

a plurality of individual accounting meters, each individual accounting meter configured as a dedicated, remotely located, electromechanical meter that tracks continuously one item of accounting information associated with one of said plurality of gaming machines, said plurality of individual accounting meters being located in close proximity to each other and remotely from at least one of said plurality of gaming machines, wherein each said individual accounting meter comprises an individual discrete physical device, and wherein each said individual accounting meter is the official meter for said one item of accounting information for said gaming machine;

at least one communication link or path between each of said plurality of gaming machines and a respective individual accounting meter or set of individual accounting meters; and a plurality of unique cryptographic keys, a unique cryptographic key of the plurality assigned to each of the dedicated individual accounting meters, and used to encrypt communications over the at least one communication link or path between each of said plurality of gaming machines and a respective individual accounting meter or set of dedicated individual accounting meters, wherein a first communication link manager is configured to perform a hashing function verification of firmware associated with a first individual accounting meter.

13. The gaming system of claim 12, wherein at least one said individual discrete physical device comprises a USB compatible electromechanical meter.

* * * * *